Jan. 14, 1936.  G. F. BROUSSEAU ET AL  2,028,044
APPARATUS FOR EXTRUDING PLASTIC MATERIAL
Filed Jan. 5, 1935  3 Sheets-Sheet 3
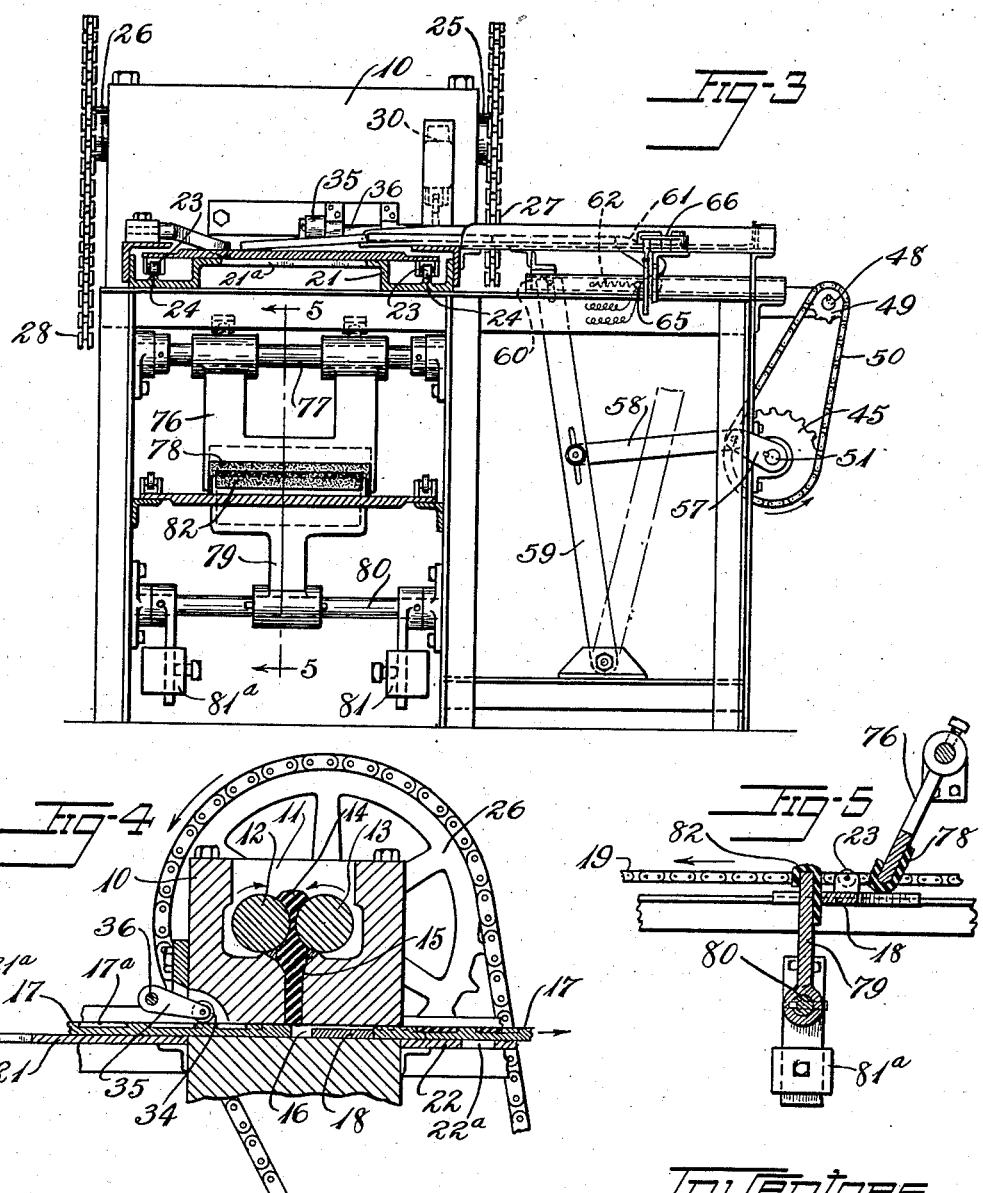
Inventors
George F. Brousseau
Harvey D. Ferris
By Eakin & Avery
Attys.

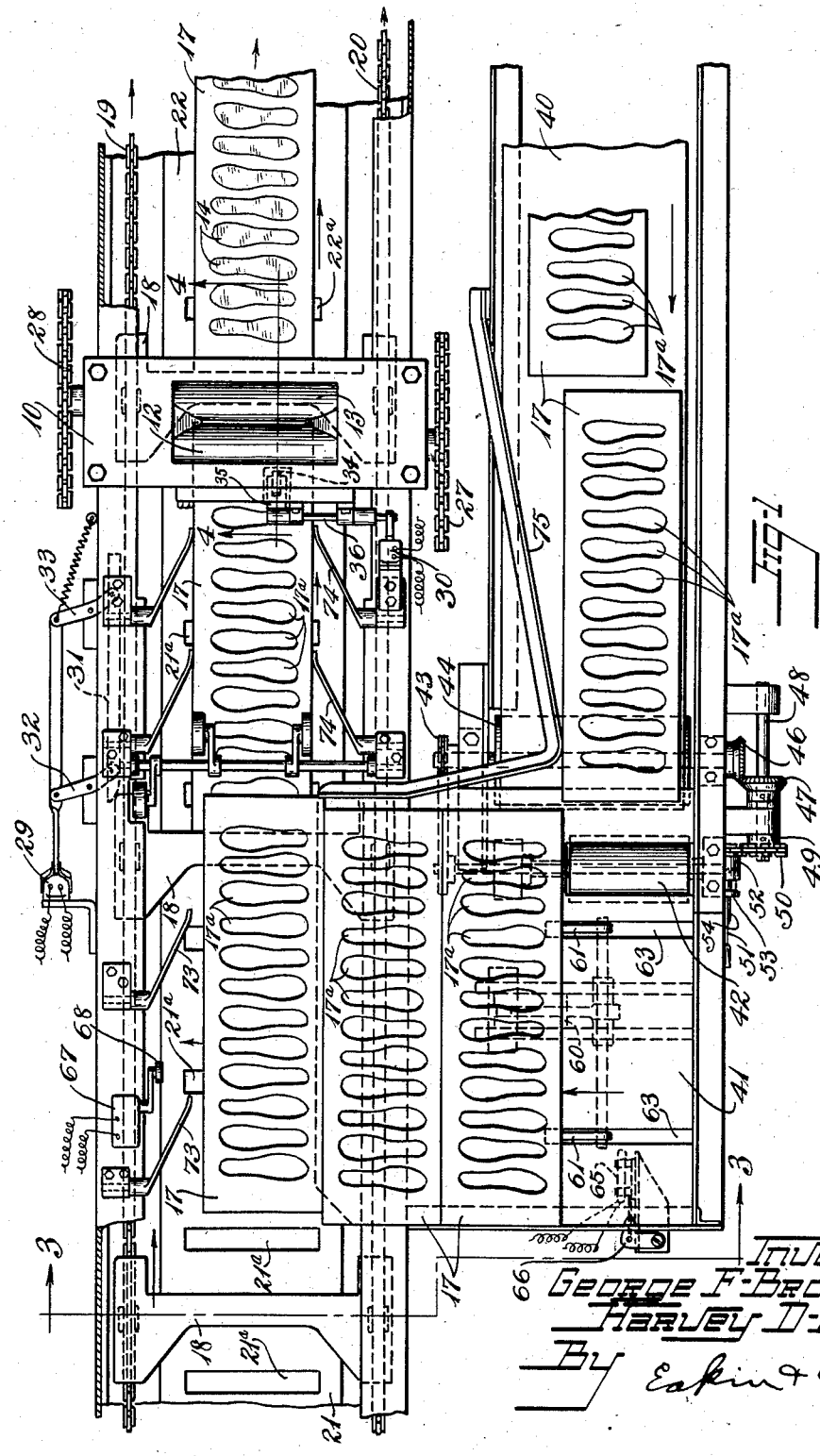

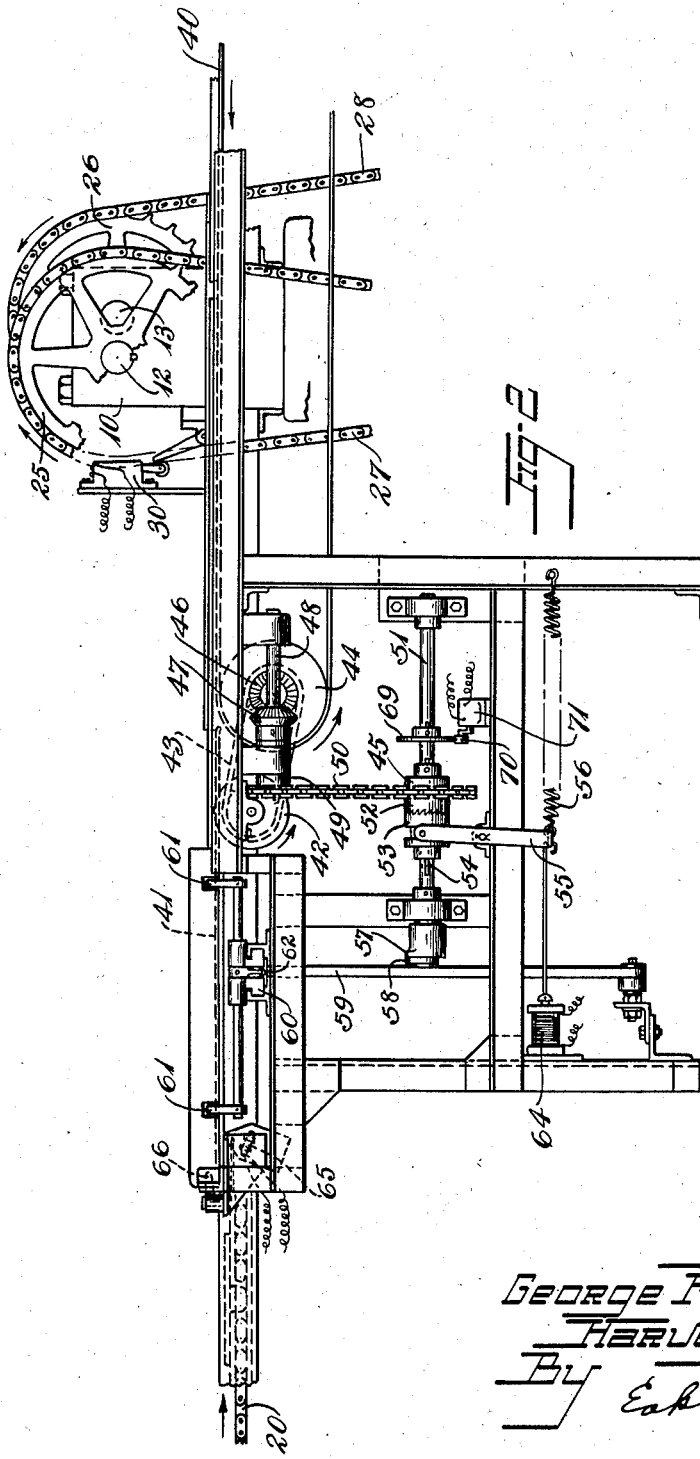

Patented Jan. 14, 1936

2,028,044

UNITED STATES PATENT OFFICE 2,028,044

APPARATUS FOR EXTRUDING PLASTIC MATERIAL

George F. Brousseau, Braintree, and Harvey D. Ferris, Newton Center, Mass., assignors to Hood Rubber Company, Inc., Watertown, Mass., a corporation of Delaware Application January 5, 1935, Serial No. 542

6 Claims. (Cl. 18—30)

This invention relates to apparatus for extruding plastic material into cavities in mold plates and is especially useful in the manufacture of molded rubber articles.

In the manufacture of rubber articles it is convenient to feed molds in succession through an extrusion device adapted to feed the plastic material to fill the cavities as the mold plates pass the device. It is the purpose of the present invention to provide means for feeding the molds in succession and for regulating the extrusion of the plastic material.

The principal objects of the invention are to accomplish successive feeding of the molds without congestion and without waste of plastic material, to provide automatic control, and generally to increase efficiency of operation.

Other objects will appear from the following description and the accompanying drawings.

Of the drawings:

Fig. 1 is a plan view of the extruding device and controlling mechanism in its preferred form, together with the adjacent portions of the mold manipulating conveyors, other portions of the conveyors being broken away, a number of molds being shown in the positions which they assume in passing through the device.

Fig. 2 is a side elevation of the apparatus shown in Fig. 1 as viewed from the right of the drawing, parts being broken away.

Fig. 3 is an end elevation, partly in section taken on line 3—3 of Fig. 1.

Fig. 4 is a section on line 4—4 of Fig. 1, showing the extrusion device and the molds in detail.

Fig. 5 is a detail sectional view taken on line 5—5 of Fig. 3, showing the mechanism for cleaning the conveyor bars, other parts being broken away.

Referring to the drawings, the numeral 10 designates the frame of the extrusion device which is formed with a feeding chamber 11 in which a pair of cooperating feed rolls 12, 13, are rotatably mounted. The plastic material 14 is forced by the rotation of these rolls through a passage 15. A mold passage 16 intersects the passage 15 and the molds 17 are passed therethrough by a conveyor having drag bars 18 which push the molds past the passage 15, where the cavities 17a in the upper faces of the molds are filled as they travel through the passage 16.

The conveyor comprises a pair of endless chains 19, 20, driven by suitable sprockets (not shown). The drag bars 18 extend from chain to chain at such intervals as to permit a mold 17 to lie between two drag bars. The molds 17 slide along tables 21, 22, level with the bottom of the passage 16, and the drag bars 18 are formed with widened ends carrying rollers 23 which engage rails 24 at each edge of the tables.

It is desirable to prevent feed of plastic material except when the passage 15 is closed by the face of a mold plate, and as the drag bars extend between molds, a space exists between adjoining molds as seen in Fig. 4. To accomplish timed feed of plastic in relation to passing of the molds, the following mechanism is provided: Rolls 12 and 13 are driven by sprockets 25, 26, and chains 27, 28, in opposite directions, through suitable gearing (not shown) from an electric motor (not shown). The motor is controlled by a pair of switches 29 and 30 arranged in series in the control circuit. A cam shoe is pivotally attached to a pair of levers 32, 33 (Fig. 1) so as normally to project in the path of the enlarged ends of the drag bars 18, and in such position to hold the switch 29 in open position, and, when deflected by presence of a bar 18, to close the switch 29. A roller 34 is mounted on a swinging arm 35 fixed to a rock shaft 36 adapted to control switch 30. Roller 34 normally stands in the path of a mold 17 and in such position holds switch 30 in open position. The presence of a mold 17 below the roller, raises the roller a sufficient amount to close the switch 30.

The cam shoe 31 is of such length, and so located with respect to the travel of the molds, that when the leading end of a mold just covers the passage 15 the leading edge of the drag bar 18 will first deflect the cam shoe to close switch 29, and, as in such position the mold will be under roller 34 so as also to have closed switch 30, both switches will close and the rolls 12, 13, will start feeding plastic material. As the mold reaches such a position that its trailing end is about to uncover the passage 15, the end of bar 18 will leave cam 31 releasing the cam and opening switch 29. As switches 29 and 30 are in series, this will stop the extruding rolls.

The conveyor chains 19, 20 travel continuously, and as each drag bar 18 passes cam 31, switch 29 will alternately close and open, but unless a mold 17 is being propelled by the conveyor and reaches the extruding position, no extrusion of plastic will result.

When the trailing end of the mold and the drag bar propelling it, which is of sufficient elevation to operate the switch 30, leaves switch 30, the switch is opened, stopping extrusion. By this mechanism waste of material by extrusion between successive molds is avoided. Should no molds be on the conveyor but the conveyor moving, no extrusion can occur as, although a drag bar will close switch 30 when passing under roller 34, the following drag bar will not have reached the shoe 31, and the motor will not be started.

In the use of the extruding device, it is desirable to have the molds travel around a circuit including the extruding device and the vulcanizing press, the molds being returned to the extruding device after the vulcanized articles have been removed therefrom. To accomplish transfer of the molds from the mold-returning conveyor to the extrusion device mold conveyor, the following mechanism is provided:

The molds are returned from the vulcanizing press on a belt conveyor 40 and are delivered to a table 41 over a live roll 42. Roll 42 is driven by a chain 43 and sprockets from a drum 44, around which the conveyor belt passes. Drum 44 also drives a sprocket 45 through bevel gear 46, 47, shaft 48, sprocket 49, and chain 50. Sprocket 45 is rotatably mounted on a shaft 51 and is provided with a jaw clutch 52. A mating jaw clutch 53 is slidably mounted on shaft 51 and engages a feather key 54. A shifter lever 55, pivoted to the frame of the table, engages the clutch 53, and a coil spring 56 normally holds the clutch out of engagement.

A crank 57, fixed to shaft 51, is connected, by a pitman 58, to a vibrating lever 59, which engages a slide 60. A pair of dogs 61 are held by coil springs 62 so as normally to project through slots 63 in table 41. As shaft 51 is rotated, dogs 61 engage the side of a mold lying on the table and move it laterally of the conveyor 40 toward the conveyor which delivers the molds to the extrusion device, as indicated by the arrow in Fig. 1. On return movement, the dogs are depressed by the mold and return under the mold. The molds are thereby advanced across the table and deposited on table 21, where they are engaged by the drag bars 18.

In order that the molds be delivered in proper relation to the advance of the drag bars, and to automatically control such advance, the following mechanism is provided:

A solenoid 64 is arranged with its armature attached to lever 55. When the solenoid is energized, clutch parts 52 and 53 will engage and lever 59 will be operated. An electric switch 65 is normally open, but is adapted to be closed by contact of the leading end of a mold delivered to table 41 from conveyor 40. This is accomplished by a lever 66 projecting in the path of the mold and connected to switch 65.

Another switch 67, normally open, carries a roller 68 which projects in the path of a drag bar 18. This switch is adapted to be closed by a passing drag bar. Switches 65 and 67 are arranged in series with each other and with the solenoid 64 so that both switches must be closed to energize the solenoid. If a mold is delivered to table 41 and closes switch 65, the mold will not be advanced toward the next conveyor until a drag bar has arrived at such position that it closes switch 67.

To prevent the stopping of the dogs 61 when the mold releases switch 65, or before the dogs have completed their cycle, shaft 51 carries a plate cam 69 adapted to depress a roller 70 carried by a switch 71. Switch 71 is so connected as to bridge switches 65 and 67 and is normally open, its roller 70, when shaft 51 is at rest, occupying a notch in the cam plate. When shaft 51 is caused to rotate, by switch 65 being closed, roller 70 is depressed and closes switch 71 which then remains closed during one complete revolution of shaft 51. As switches 65 and 71 are connected in parallel, and switch 71 is closed immediately after shaft 51 starts, switch 71 will be closed before switch 64 is opened by travel of the mold laterally of the mold conveyor, and will prevent stopping of shaft 51 before it has made one revolution to move dogs 61 through a complete cycle.

Suitable guides such as 73, 74 and 75, are provided to keep the molds in proper alignment.

In order to prevent any deposits of rubber composition accumulating on the drag bars 18 to such an extent as to interfere with proper handling of the molds, a wiper plate 76 is pivoted on a shaft 77 so as to hang in the path of the drag bars, preferably during their return flight (see Figs. 3 and 5). A facing of unvulcanized rubber 78 is fastened to the wiper plate, and as the bars 18 pass, the facing contacts first with their leading edges and is then dragged across the face of the bar. Any rubber particles adhering to the bar will have a greater affinity for the uncured rubber facing and will be wiped from the bar.

A similar wiper plate 79 is pivoted below the flight of the conveyor on a shaft 80, provided with counterweights 81—81a to hold the plate in the path of the drag bars 18. A facing 82 of unvulcanized rubber, applied thereto acts in a manner similar to the pad 78. Unvulcanized crepe rubber has been found suitable as a material for the facings 78 and 82.

To permit any crumbs of rubber to escape and prevent their attachment to the under side of the mold plates, the tables 21, and 22 are formed with slots 21a and 22a, therethrough.

The operation of the device is as follows:

The empty molds are carried along return conveyor 40 from right to left of Fig. 1 until one contacts with lever 66 closing switch 65. The advance conveyor, carrying the drag bars 18 is moving continuously. As one of its bars reaches such position that it closes switch 67, dogs 61 start moving forward and advance the mold toward the advance conveyor, returning to engage the next mold. As the first mold through switch 65 engages clutch 52, 53, switch 71 is closed for a complete cycle of the advancing dogs 61, so that breaking of the solenoid circuit cannot occur until one revolution of shaft 51 is completed.

As the leading mold is forced onto the advance conveyor, it is engaged by one of the bars 18 and advanced toward the extruding rolls. These rolls remain stationary until the leading end of the mold has closed switch 30 by raising roller 34 and the bar 18, which is pushing the mold has advanced the leading end of the mold past the extruding opening. At this point the bar 18 closes switch 29 and extrusion starts. When the bar 18 leaves shoe 31 and opens switch 29, or just before the mold passes the extrusion opening, the extrusion rolls stop operating and do not start until the leading end of a succeeding mold is past the extrusion opening, thereby preventing extrusion between molds.

We claim:

1. Apparatus for extruding plastic material, said apparatus comprising means for forcing plastic material through a delivery opening, continuously operated endless conveyor means for advancing a plurality of molds in spaced relation and in succession past said opening and means controlled by the advancing means for so controlling the extruding means as to permit flow of plastic only when a mold is opposite said delivery opening.

2. Apparatus for extruding plastic material, said apparatus comprising means for forcing plastic material through a delivery opening, a table extending past said opening, a continuously operated endless conveyor having drag bars for pushing molds along said table past said delivery opening, means for delivering molds to said table in timed relation to the passing of the drag over said table, and means controlled by the advancing means for so controlling the extruding means as to permit flow of plastic only when a mold is opposite said delivery opening.

3. Apparatus for extruding plastic material, said apparatus comprising means for forcing plastic material through a delivery opening, a table extending past said opening, a continuously operated endless conveyor having drag bars for feeding molds along said table past said delivery opening, a second conveyor for returning empty molds, means for transferring molds one at a time from said last named conveyor to said table, means controlled by the position of said drag bars with relation to said table for controlling such transfer of the molds and means controlled by the presence of molds opposite the forcing means for so controlling the extruding means as to permit flow of plastic only when a mold is opposite said delivery opening.

4. Apparatus for extruding plastic material, said apparatus comprising means for forcing plastic material through a delivery opening, a table extending past said opening, a continuously operated endless conveyor having drag bars for feeding molds along said table past said delivery opening, a second conveyor for returning empty molds, means for removing molds laterally one at a time from said last named conveyor onto said table, means controlled by the movement of the drag bars across the table for regulating the lateral movement of the molds, and means controlled by the presence of molds opposite the forcing means for preventing delivery of plastic material when no mold covers the delivery opening.

5. Apparatus for extruding plastic material, said apparatus comprising means for forcing plastic material through a delivery opening, a continuously operated conveyor having drag bars for propelling molds in succession past said opening, an electrical control member located adjacent said opening and in the path of the molds, and a second electrical control member located in the path of the drag bars, said control members being adapted collectively to control said forcing means to prevent the flow of plastic material except when a mold is covering said opening.

6. Apparatus for extruding plastic material, said apparatus comprising a conveyor for delivering molds, an electrical switch located in the path of the molds and adapted to be actuated by the leading mold thereon, means controlled by said switch for moving a mold laterally of the conveyor toward a table, a continuously operated drag bar conveyor for sweeping molds along said table, a second switch located along said table and adapted to be actuated by passing drag bars, said last named switch being adapted to prevent the lateral movement of the molds except when a drag bar is in proper position to engage the transferred mold, an extruding head having a delivery opening in the path of the molds being propelled along said table, and electrical control means located in the path of said molds for permitting the flow of plastic from said extruding head only when a mold is presented to said delivery opening.

GEORGE F. BROUSSEAU.
HARVEY D. FERRIS.